J. H. FLYNN, Jr.
HOOK AND SHACKLE FOR PULLEY BLOCKS.
APPLICATION FILED APR. 26, 1920.

1,363,401. Patented Dec. 28, 1920.

INVENTOR
John H. Flynn Jr.

UNITED STATES PATENT OFFICE.

JOHN H. FLYNN, JR., OF CINCINNATI, OHIO.

HOOK AND SHACKLE FOR PULLEY-BLOCKS.

1,363,401. Specification of Letters Patent. Patented Dec. 28, 1920.

Application filed April 26, 1920. Serial No. 376,571.

*To all whom it may concern:*

Be it known that I, JOHN H. FLYNN, Jr., a citizen of the United States, residing in Cincinnati, in the county of Hamilton and State of Ohio, have invented new and useful Improvements in Hooks and Shackles for Pulley-Blocks, of which the following is a specification.

An object of my invention is to produce an improved hook and shackle construction for pulley blocks in which greater strength, lightness and cheapness of construction is attained than in hook and shackle constructions known to me, by the utilization of such stock materials as round and half round bar iron and the like, by bending the same in the shapes described with suitable formers, thus saving in forging, pattern and foundry costs such as necessitated in present hook and shackle construction.

This and other objects are attained in the hook and shackle construction disclosed in the accompanying specification and illustrated in the accompanying drawings in which:

Fig. 2 is a transverse sectional view taken on the line 2—2 of Fig. 1.

Fig. 4 is a transverse sectional view taken on the line 4—4 of Fig. 3.

Figure 5:
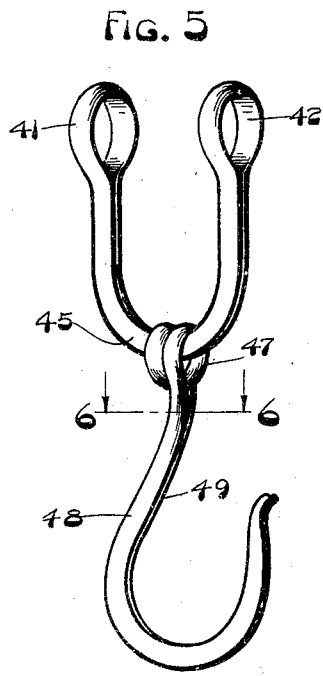
Figs. 5 and 7 are perspective views of modified forms of hook and shackle construction similar to those shown in Figs. 1 and 3.
Figure 7:
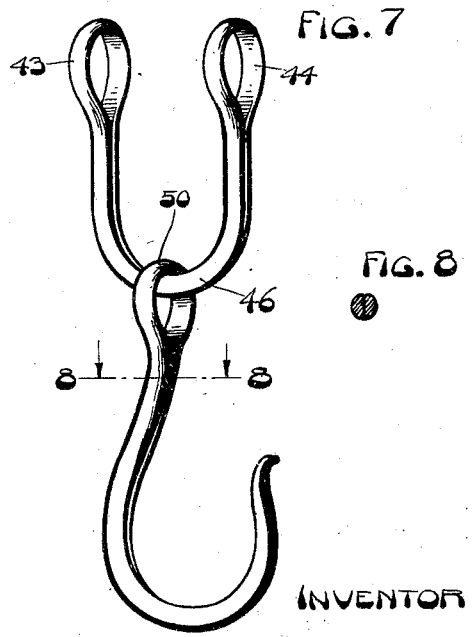

Figs. 6 and 8 are transverse sectional views taken on the lines 6—6 and 8—8 of the respective Figs. 5 and 7.

The shackle and hook construction are each formed separately, but are inseparably joined. In the forms shown in Figs. 1 to 4 inclusive the material of which the hooks and shackles are formed are of round iron or steel as shown in the cross sections of Figs. 2 and 4. In the forms in which the invention is shown in Figs. 5 to 8 inclusive, the material is of half round iron or steel stock or the like of the shape shown in the cross section of Figs. 6 and 8 inclusive.

Figure 1:
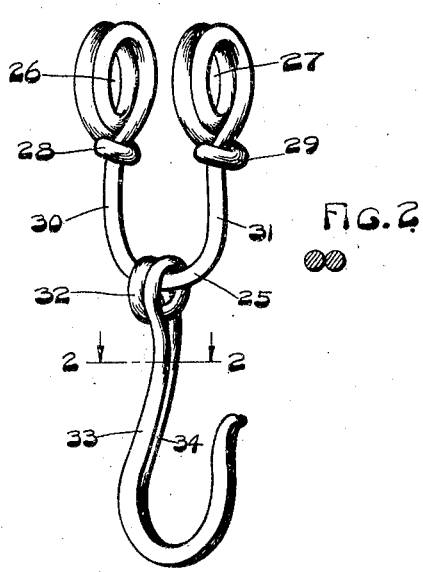
Figure 1 is a perspective view of a hook and shackle embodying my invention.

The shackle of the form shown in Fig. 1 is made of a length of bar bent U shaped at its central point 25 and having its ends bent into the shape of eyes 26 and 27 with the ends 28 and 29 bent back upon the branches 30 and 31 of the shackle. The hook in this form is of the same round stock and is formed previous to the completion of the shackle and having an eye 32 with the ends 33 and 34 brought together and bent into hook shape with the ends tapered and turned sligthly outward as shown. This hook eye 32 is passed over one uncompleted end of the shackle which end is thereafter completed.

Figure 3:
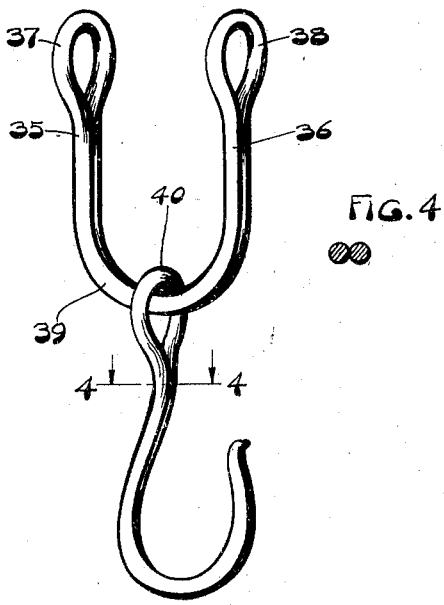
Fig. 3 is a modified form of hook and shackle embodying my invention.

The shackle of Fig. 3 is made of an endless or ring shaped round section which is bent or folded centrally and then flattened into U-shape with branches 35 and 36 which terminate in eyes 37 and 38. The hook of Fig. 3 is of round material, the ends being bent over the central portion 39 and bent together to form an eye 40 with the ends bent into hook shaped form as shown.

In Figs. 5 and 7 the shackles are made of half round material, but eyes 41 and 42, 43 and 44 are formed as in the construction of Fig. 3, with the central portions 45 and 46 provided for hooks. The hook of Fig. 5 is of half round material as is the shackle, but an eye 47 is formed upon U portion 45 after the shackle is formed, the ends 48 and 49 being brought with their flat sides together to form a hook as shown. The hook of Fig. 7 corresponds to the hook of Fig. 3, but, although made in the same manner, is constructed of half round material, an eye 50 being provided at the top for receiving the central portion of the shackle.

The hooks and shackles shown in Figs. 5 to 8 inclusive of half round material, are preferred by me over the forms made of round material, shown in Figs. 1 to 4 inclusive, because of the increased strength attained by a material of such cross section as compared to the round section. The principle of operation of this half round construction is the same as that of a beam in which the greatest cross sectional dimension is always placed vertically, with the narrow dimension horizontal. This principle is applied with equally efficient operation in both the shackle and hook, but in Figs. 1 to 4 the strength gained by the use of half round material is retained by using more material but in round form.

Having thus described my invention what I claim is:—

A hook and shackle of substantially identical cross section, the shackle consisting of a flattened substantially ring shaped member bent into U shape and having loops at the ends of the U, the hook consisting of a length of material bent centrally of the length around the bend of the shackle to form a loop thereon and having the ends brought together and bent into hook shape, the loop of the hook being of substantially the same diameter as the loops of the shackle to prevent displacement therefrom.

In witness whereof I affix my signature in the presence of two witnesses.

JOHN H. FLYNN, Jr.

Witnesses:
S. C. SWARTSEL,
W. J. SCHULTZ.